Dec. 12, 1950          G. E. BANGE          2,533,755
SPEED CONTROLLED COUPLING
Filed April 12, 1945
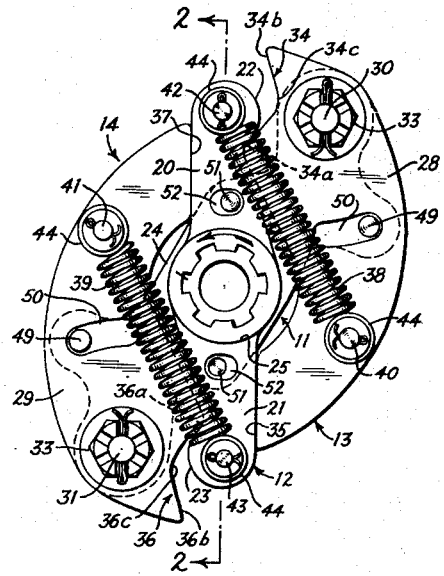
INVENTOR.
George E. Lange
BY
F. Bascom Smith
ATTORNEY Patented Dec. 12, 1950

2,533,755

UNITED STATES PATENT OFFICE 2,533,755

SPEED CONTROLLED COUPLING

George E. Bange, Wichita, Kans., assignor to Bendix Aviation Corporation, New York, N. Y., a corporation of Delaware Application April 12, 1945, Serial No. 587,868

6 Claims. (Cl. 64—25)

1

This invention relates to couplings, and more particularly to means for connecting two rotating parts so that automatic angular adjustment of said parts may be effected during rotation thereof.

One of the objects of the present invention is to provide novel apparatus for mechanically coupling two rotating elements to each other while permitting of angular adjustment of one of said elements relative to the other.

Another object of the invention is to provide a novel automatic variable coupling for rotating parts which functions in accordance with the speed of rotation of said parts.

A further object is to provide novel coupling means of the above character whereby two rotating parts may be automatically angularly adjusted in one direction relative to each other at one speed of rotation and in the other direction at a higher speed of rotation.

A still further object is to provide a novel centrifugally responsive device for drivably connecting two rotatable parts and for effecting relative angular movements of said parts in different directions at different increasing speeds of rotation of the parts.

Another object is to provide coupling means of the above character which also functions to some extent as a flexible coupling to avoid damage which might otherwise be occasioned by sudden shocks and quick changes of speed.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, Fig. 1 is an end elevation looking from the left of Fig. 2, showing one form of the coupling unit comprehended by the present invention;

Fig. 2 is a vertical transverse section on the line 2—2 of Fig. 1;

Fig. 3 is a detail view showing one of the centrifugally responsive weight members of the coupling unit; and Figs. 4 and 5 are detail views of the driven and driving members, respectively, of the coupling unit.

2

Referring to the drawings, the novel coupling means comprehended by the present invention is adapted for use between two cooperatively associated instrumentalities wherein it is desired to vary the operation of one instrumentality relative to the operation of the other instrumentality as the speed of the latter instrumentality is increased, said coupling means serving to drivably connect said instrumentalities and to effect relative angular movement thereof.

As shown, the novel coupling unit whereby the operation control shaft 10 of one instrumentality is flexibly connected to a driven part of an associated instrumentality for automatic, angular adjustment relative thereto, comprises two end members 11 and 12, and two novel centrifugally responsive members 13 and 14 for drivably connecting end member 11 to end member 12, and for effecting relative angular movement of said end members in different directions at different increasing speeds of rotation.

For purposes of description, end member 11 may be considered as the driving member of the coupling unit since it is connected to the prime mover which, in the present instance, is a rotating part of an instrumentality with which the instrumentality including the shaft 10 is associated. As shown, driving member 11 is in the form of a lever having two arms 15 and 16 which extend in a radial direction from the axis of rotation of shaft 10 and are disposed diametrically opposite each other. The hub 17 of member 11 is provided with external splines 18 adapted to engage an internally splined rotating part of the prime mover or instrumentality for imparting rotation to driving member 11 in a counterclockwise direction as viewed in Fig. 1. A bearing sleeve 19 is fitted into driving member 11 and is loosely mounted on a smooth reduced portion of shaft 10.

End member 12, which may be conveniently referred to as the driven member, is also in the form of a lever having two radially extending, diametrically opposite arms 20 and 21. For purposes to be hereinafter described, arm 20 is formed at one side and adjacent the free end thereof with a rounded nose or projection 22, and arm 21 is formed at the opposite side and adjacent the free end thereof with a similar rounded nose or projection 23 (Fig. 1). Driven member 12 is engaged over shaft 10, and is drivably connected to the latter by means of splines 24 which are formed within the hub 25 of said member and mesh with external splines 26 on said shaft. Members 11 and 12 are held on shaft 10 and substantially in abutting relation by a nut 27 which is threaded on the end of said shaft. Nut 27 engages the outer end of spacer sleeve 19 which is sufficiently longer to insure a slight clearance between members 11 and 12 to permit free, relative angular movements of said members.

The novel centrifugally responsive means 13 and 14 provided for operatively connecting members 11 and 12, and for automatically effecting relative angular movements of said members, comprise two weights 28 and 29 which are pivotally mounted adjacent one end thereof on laterally extending shouldered pins 30 and 31, respectively, secured in any suitable manner in the outer ends of arms 15 and 16, respectively, of driving member 11. The enlarged central portions of pins 30, 31 are surrounded by loose fitting bearing sleeves 32 (Fig. 3) in weights 28, 29, and said pins have threaded thereon weight retaining nuts 33, 33.

As shown in Fig. 1, weights 28 and 29 are disposed on opposite sides of and in the same radial plane with driven member 12, and the pivots 30 and 31 for said weights are located opposite the noses 22 and 23, respectively, on said member, said pivotal arrangement of weights 28, 29 being such that each tends to swing in a counter-clockwise direction (as viewed in Fig. 1) under the influence of centrifugal force upon rotation of driving member 11.

Weight 28 is formed at the side thereof adjacent driven member 12 with a cam surface 34 (Fig. 1) adapted to engage the nose 22 on arm 20, and with a flat or straight surface 35 adapted to engage the adjacent side of arm 21, said cam surface consisting of two high parts 34a and 34b, and an intermediate low part 34c. Weight 29 is formed at the side thereof adjacent driven member 12 with a similar cam surface 36 (Figs. 1 and 3) adapted to engage the nose 23 on arm 21, and with a flat or straight surface 37 adapted to engage the adjacent side of arm 20, said cam surface also consisting of two high parts 36a and 36b, and an intermediate low part 36c.

In the normal position of the above described parts, as illustrated in Fig. 1, the surface 35 of weight 28 is engaged with one side of the arm 21 of driven member 12, and the surface 37 of weight 29 is engaged with the opposite side of arm 20 of said driven member. Under these conditions, the high part 34a of cam surface 34 on weight 28 is engaged with the nose 22 on arm 20, and the high part 36a of cam surface 36 on weight 29 is engaged with the nose 23 on arm 21. Thus, end member 12 and shaft 10 will be rotated in a counter-clockwise direction with driving member 11 by weights 28 and 29 through the described connections for said weights with driving member 11 and through engagement of the cam surfaces 34 and 36 with the noses 22 and 23 on driven member 12.

The centrifugal weights 28 and 29 are normally yieldably retained in the illustrated positions by suitable resilient means, such as pull springs 38 and 39 which are of like tension, and act to control the speeds at which said weights simultaneously move outwardly to various positions in response to centrifugal forces acting thereon during rotation of members 11 and 12 and shaft 10. Springs 38 and 39 have corresponding ends thereof connected to laterally extending pins 40 and 41 which are secured in any suitable manner in weights 28 and 29, respectively. The opposite ends of springs 38 and 39 are connected to laterally extending eccentric pins 42 and 43 which are adjustably mounted in suitable openings in the arms 20 and 21, respectively, of driven member 12. In order to eliminate frictional drag of springs 38, 39 on pins 40, 41, 42 and 43, the ends of said springs surround small sleeves 44, which, in turn, are journalled on said pins.

The tension of springs 38, 39 may be varied to control the outward movement of weights 28, 29 at desired speeds by rotating the eccentric pins 42, 43. For this purpose, said pins have secured thereto in any suitable manner enlarged heads 45, 45 provided with slots 46, 46 to receive a screw driver or other similar tool. Pins 42, 43 are held in adjusted positions by spring pressed ball detents 47, 47 which are carried in suitable pockets formed in arms 20 and 21 of driven member 12, and engage in teeth 48 formed on and equally spaced around the undersides of heads 45, 45. It is to be understood that when adjusting the tension of springs 38, 39, the pins 42, 43 are rotated equal degrees so that the tension of said springs will be uniform at all times, the teeth 48 on heads 45, 45 serving as the means for determining the degree of adjustment given each of said pins.

When the coupling unit is rotated in a counter-clockwise direction, as viewed in Fig. 1, below a predetermined low speed, the various parts of the coupling unit occupy the positions shown in Fig. 1, and the instrumentality under the control of shaft 10 is operated at one setting. As the speed of driving member 11 is increased to a predetermined speed or within a predetermined range of speeds, the centrifugal forces acting on the weights 28 and 29 at said speed or speed range cause said weights to pivot counter-clockwise (Fig. 1) about pivots 30, 31 against the tension of springs 38, 39 and, hence, move the high parts 34a and 36a of cam surfaces 34, 36 out of engagement with the noses 22, 23 on driven member 12. Thereupon, 38 and 39 under the centrifugal pull of weights 28, 29 cause the noses 22 and 23 on driven member 12 to follow into the low parts 34c and 36c of cam surfaces 34 and 36, resulting in an angular movement of driven member 12 in a clockwise direction (Fig. 1) relative to driving member 11, thereby effecting a lag or delay in the operation of the instrumentality under the control of shaft 10.

When the speed of driving member 11 is increased to a predetermined speed which is higher than that required to cause weights 28, 29 to move outwardly to the above described predetermined or intermediate position, the centrifugal forces acting on said weights at said higher speed cause the latter to swing further outwardly about pivots 30, 31 in a counter-clockwise direction (Fig. 1) against the efforts of springs 38, 39. Under these conditions, the low parts 34c, 36c of cam surfaces 34, 36 are moved out of engagement with noses 22, 23, and the high parts 34b, 36b of said cam surfaces are moved into engagement with said noses. This engagement of high parts 34b, 36b of cam surfaces 34, 36 with noses 22, 23 causes an angular movement of driven member 12 in a counter-clockwise direction (Fig. 1), or ahead, relative to driving member 11, thereby effecting an advance in the operation of the instrumentality under the control of shaft 10.

In order to limit the extent of outward movement of weights 28, 29, the arms 15, 16 of driving member 11 have secured therein laterally extending pins 49, 49 which engage in arcuate slots 50, 50, formed in said weights, the inner ends of said slots being engaged by said pins when the high parts 34b, 36b of cam surfaces 34, 36 are in engagement with noses 22, 23 as above described, thus preventing movement of weights 28, 29 beyond this position. Arms 15, 16 of driving member 11 have also secured thereon laterally extending pins 51, 51 which engage in short arcuate slots 52, 52 formed in arms 20, 21 of driven member 12 to hold said members in relative position, said slots being, however, of sufficient length to permit relative angular movement of said members as above described.

As the angular speed of the parts is reduced to or slightly below the predetermined speeds at which weights 28, 29 are swung outwardly to their different positions, in the manner above described, springs 38, 39 return said weights to their normal or illustrated positions, thereby reversing the relative angular movements of the parts.

It will be understood that by properly designing the parts above described, a variety of modes of operation may be obtained. If the relative angular positions of member 11 and 12 is plotted against the angular speeds of member 11, the contour of the curve obtained may be varied, for example, by changing the mass of weights 28, 29, by changing the tension of springs 38, 39 by eccentric pins 42, 43, by changing the contour of cam surfaces 34, 36, by substituting anti-friction rollers on driven member 12 for the noses 22, 23, by varying the anchoring points of springs 38 and 39 relative to the pivots of the weight members. The relative movements of the members 11, 12 may, for example, be either gradual or abrupt, or they may be obtained in a series of abrupt or gradual steps.

There is thus provided a novel coupling unit for rotatable parts, whereby relative angular movements of said parts in either direction may be automatically effected during rotation thereof, and whereby relative angular movements in opposite directions may be effected as the speed of rotation increases. Additionally, said coupling unit is so constructed as to effect different relative angular movements of the parts at predetermined speeds thereof in response to centrifugal forces. The coupling unit provided may be employed to automatically control the spark setting of an ignition system in an internal combustion engine. Furthermore, the novel coupling unit is simple in construction and operation, has relatively few parts, and is also compact and reliable.

Although only one embodiment of the present invention is illustrated and described in detail, it is to be expressly understood that the same is not limited thereto. As will now be apparent to those skilled in the art, various changes, such as, in the design and arrangement of the parts illustrated, may be made without departing from the spirit and scope of the invention. For example, the relative angular movements of members 11 and 12 may be effected by one weight only, two being preferably employed to balance the coupling unit. Also, the outward movement of weights 28, 29 in response to centrifugal force may be controlled so that relative angular movement of members 11 and 12 is effected in one direction only by shortening the slot 50 in each of said weights. Additionally, the cam surfaces 34, 35 may be formed on the driven member 12, and the noses 22, 23, in turn, formed on the weights 28, 29, if desired. For a definition of the limits of the invention, reference is had primarily to the appended claims.

What is claimed is:

1. Apparatus of the class described comprising a rotatable driving member, a rotatable driven member, and means drivably connecting said members whereby the same may be rotated together and are adapted for limited angular movement relative to each other, said connecting means comprising a weight member mounted on one of said rotatable members for pivotal movement relative thereto in response to centrifugal force, said weight member having a surface with angularly disposed sides selectively engageable by the other of said rotatable members during different ranges of movement of said weight member in response to increasing centrifugal force, one said side being inclined to effect relative angular movement of said driving and driven members and the other said side being inclined to effect opposite relative angular movement thereof as the centrifugal force increases from minimum to maximum, and resilient means connecting said other rotatable member to said weight member at a point on the latter which is eccentric to the pivotal axis thereof for resisting movement of said weight member in response to centrifugal force and for yieldably urging said other rotatable member into engagement with said surface at all speeds of rotation and into engagement with said surface at one end of the latter when the apparatus is at rest.

2. Apparatus of the class described comprising a rotatable driving member, a rotatable driven member, and means operably connecting said members comprising a centrifugally responsive weight mounted on one of said members for pivotal movement about a single pivot and being movably engageable by the other of said members, the surface of said weight along which it is engaged by said other member during pivotal movement of said weight in response to centrifugal force having a central portion thereof closest to said pivot to thereby effect relative angular movement of said driving and driven members in opposite directions during different ranges of increasing speeds of rotation of said members, and resilient means connecting said other member to said weight at a point on the latter which is eccentric to the pivotal axis thereof for resisting movement of said weight in response to centrifugal force and for urging said other member into engagement with said surface at all speeds of rotation and into engagement with said surface at one end of the latter when the apparatus is at rest.

3. Apparatus of the class described comprising two rotatable members adapted for angular movement relative to each other, and means for drivably connecting said members comprising a centrifugally responsive weight pivotally mounted on one of said rotatable members, said weight having a cam surface thereon movably engageable by the other of said rotatable members during pivotal movement of said weight in response to centrifugal force, the low point of said cam surface being closest to the pivotal axis of said weight to thereby effect relative angular movement of said rotatable members in different directions in response to centrifugal forces acting on said weight as the speed of rotation increases from minimum to maximum, and resilient means connecting said other rotatable member to said weight at a point on the latter which is eccentric to the pivotal axis thereof for resisting movement of said weight in response to centrifugal force and for urging said other rotatable member into engagement with said cam surface at all speeds of rotation and into engagement with a high point of said cam surface at one end thereof when the apparatus is at rest.

4. Apparatus of the class described comprising a rotatable driving member, a rotatable driven member, and means drivably connecting said members whereby the latter rotate together and are adapted for limited angular movement relative to each other, said connecting means comprising a weight pivotally mounted on one of said members, said weight having a surface along which it is engaged by the other of said members during pivotal movement of said weight in response to centrifugal force, the portion of said surface nearest the pivotal axis of said weight being intermediate the ends of said surface which is engaged by said other member as the centrifugal force acting upon the weight increases from minimum to maximum, and resilient means connecting said other member to said weight at a point on the latter which is eccentric to the pivotal axis thereof for resisting movement of said weight in response to centrifugal force and for urging said other member into engagement with said surface at all speeds of rotation and into engagement with said surface at one end of the latter when the apparatus is at rest.

5. In apparatus of the class described, two rotatable members adapted for angular movement relative to each other, and means for drivably connecting said members comprising a centrifugally responsive weight pivotally mounted on one of said members on a single pivot fixed in its relation to said one member, said weight having a reversing cam surface thereon engageable by said other member, said engagement being substantially line contact and movable from one end to the other of said surface during movement of said weight in response to centrifugal force as the latter increases from minimum to maximum, said engagement being movable along one end portion of said surface during one range of speeds to effect relative rotation of said members in one direction and movable along the other end portion of said surface during another range of speeds to effect relative movement of said members in the opposite direction, and resilient means connecting said other member to said weight at a point on the latter which is eccentric to the pivotal axis thereof for resisting movement of said weight in response to centrifugal force and for urging said other member into engagement with said cam surface at all speeds of rotation and into engagement with said cam surface at one end of the latter when the apparatus is at rest.

6. Apparatus of the class described comprising a rotatable driving member, a rotatable driven member, and means drivably connecting said members comprising a centrifugally responsive weight pivotally mounted on one of said members and having angularly disposed surfaces which converge toward a plane containing the pivotal axis of said weight, said surfaces being selectively engageable by said other member and the line of contact with each surface being movable therealong as the weight is pivotally actuated in response to increasing centrifugal force to thereby effect a predetermined limited relative angular movement of said rotatable members in one direction and then effect a predetermined limited relative angular movement of said members in the other direction in response to centrifugal forces acting on said weight member at different increasing speeds of rotation of said members, and resilient means connecting said other member to said weight at a point on the latter which is eccentric to the pivotal axis thereof for resisting movement of said weight in response to centrifugal force and for yieldably urging said other member into engagement with one or the other of said surfaces at all speeds of rotation and into engagement with one of said surfaces at the end thereof remote from said cam when the apparatus is at rest.

GEORGE E. BANGE.

REFERENCES CITED

The following references are of record in the file of this patent:

UNITED STATES PATENTS

| Number | Name | Date |
| --- | --- | --- |
| 1,257,630 | Newton | Feb. 26, 1918 |
| 1,275,026 | Herzog et al. | Dec. 21, 1920 |
| 1,362,689 | Gadke | Dec. 21, 1920 |
| 1,916,181 | Klaiber | June 27, 1933 |
| 2,079,009 | Gregg | May 4, 1937 |
| 2,391,525 | Spengler | Dec. 25, 1945 |
| 2,393,344 | Scott | Jan. 22, 1946 |